(12) United States Patent
Chiavazza et al.

(10) Patent No.: US 6,989,464 B2
(45) Date of Patent: Jan. 24, 2006

(54) PROCESS FOR THE PREPARATION OF GRANULES OF METHIONINE

(75) Inventors: Veronique Chiavazza, Caluire (FR); Bruno Alban, Villeurbanne (FR)

(73) Assignee: Adisseo France S.A.S., Antony (FR)

( * ) Notice: Subject to any disclaimer, the term of this patent is extended or adjusted under 35 U.S.C. 154(b) by 0 days.

(21) Appl. No.: 10/333,370

(22) PCT Filed: Jul. 16, 2001

(86) PCT No.: PCT/EP01/09877

§ 371 (c)(1),
(2), (4) Date: Jan. 21, 2003

(87) PCT Pub. No.: WO02/11555

PCT Pub. Date: Feb. 14, 2002

(65) Prior Publication Data

US 2003/0165611 A1    Sep. 4, 2003

(30) Foreign Application Priority Data

Aug. 4, 2000    (EP) ................................ 00116832

(51) Int. Cl.
*C08C 321/00*    (2006.01)
(52) U.S. Cl. .................................... 562/559
(58) Field of Classification Search ............. 562/400, 562/512, 553, 556, 559
See application file for complete search history.

(56) References Cited

U.S. PATENT DOCUMENTS 6,126,972 A * 10/2000 Korfer et al. ................... 426/2
6,287,627 B1 * 9/2001 Binder et al. ............... 426/656

FOREIGN PATENT DOCUMENTS

| CA | 2285820 | * | 4/2000 |
| EP | 0 100 168 A2 | | 2/1984 |
| EP | 0 959 068 A2 | | 11/1999 |
| EP | 0 992 490 A1 | | 4/2000 |
| JP | A 59-199670 | | 11/1984 |
| JP | A 8-205787 | | 8/1996 |
| WO | WO 98/37772 | | 9/1998 |
| WO | WO 00/04880 | | 2/2000 |

* cited by examiner

*Primary Examiner*—Johann Richter
*Assistant Examiner*—Karl Puttlitz
(74) *Attorney, Agent, or Firm*—Oliff & Berridge, PLC

(57) ABSTRACT

A process for the preparation of granules of methionine which process comprises (a) forming a mixture of methionine powder, a binding agent and water (b) applying the mixture to high shear rate mixing, thereby forming granules of said mixture; and (c) drying said granules. Granules produced by the aforementioned process characterised by a bulk density of at least 0.6 g/cm$^3$, and a particle siye distribution of from 50 to 2000 microns are also claimed as well as an animal feed composition comprising the granules.

9 Claims, No Drawings

PROCESS FOR THE PREPARATION OF GRANULES OF METHIONINE

This application is a 371 of PCT/EP01/09877 Jul. 16, 2001

The present invention relates to a process for the preparation of free flowing granules of methionine suitable for use as an animal feed supplement.

Methionine is used as a feed additive for animals, in particular ruminants and poultry, and is useful in the production of animal proteins. Methionine is produced by the conversion of methionine nitrile to methionine amide, followed by saponification of the amide. The resulting methionine product is a fine powder and a problem encountered on the production plant is the presence of static electricity, providing a high risk of explosion. To overcome this problem, the powdered methionine is recrystallised. This involves an additional step in the process. The recrystallised methionine may then be used in this form as the feed supplement.

An alternative means to overcome this problem is disclosed in European Patent No. 0992490 in which the powdered methionine is converted to granules. This method comprises forming extrudates from the powdered methionine, and then treating the extrudates to provide substantially spherical particles. EP-A-0992490 purports to provide a method of producing granules of methionine for use in animal feed which avoids the problem of dust and ultimate risk associated with static electricity.

We have developed a process for the production of granules of methionine that produces directly the spherical granules of methionine without the need for the additional step of treating the granules to obtain the desired spherical shape.

Accordingly, the present invention provides a process for the preparation of granules of methionine which process comprises (a) forming a mixture of methionine powder, a binding agent and water (b) applying the mixture to high shear rate mixing, thereby forming granules of said mixture; and (c) drying said granules.

The process of the present invention negates the need to shape the product. We have also found that the resulting granules have specific advantageous properties that render them particularly suitably for incorporation into animal feed, in particular good mixability.

For the purposes of the present invention, "methionine powder" is defined as particles of methionine in which less than 40% of the particles have a size greater than 150 microns. In particular, it is preferred that less than 10% of the particles are greater than 150 microns and that the powder has a bulk density of from 300 to 500 kg/m$^3$ and a tapped density of from 500 to 600 kg/m$^3$.

The process of the present invention comprises a first step of forming a mixture of methionine powder, a binding agent and water. The methionine powder may be used as is, in the solid form, or may be used as a suspension of methionine in water. Suitably, the mixture comprises from 30 to 82 weight %, preferably from 55 to 80 weight % methionine.

Suitable binding agents for inclusion into the mixture include celluloses, for example, microcrystalline cellulose, hydroxypropyl methyl cellulose and carboxyl methyl cellulose; starch for example native, pregelatinized or modified starch; hydrocolloid gums, for example, xanthane gum, guar gum, carob gum and arabic gum; polyvinyl alcohol; polyvinyl pyrrolidone; sugars and syrup of sugars, for example a mixture of oligo and polysaccharides. The preferred binder is a starch or a hydrocolloid gum, especially xanthane or arabic gum. Suitably, the binder is present in the mixture in an amount of from 0.3 to 10% by weight, preferably from 0.5 to 5% by weight. The binder may be added in the solid form or in the liquid form, especially as an aqueous solution.

Water may be admixed with the other components before application of the high shear rate mixing or may be added during the high shear mixing. Water may be present in the mixture in an amount of from 15 to 65% by weight, preferably from 15 to 40% by weight.

Additional components may be present in the mixture. A surfactant may be added to the mixture. Suitable surfactants include non ionic surfactants such as polyoxyethylene sorbitan fatty acid esters 20 to 80 or anionic surfactants such as dodecyl sodium sulphonate. The surfactant may be present in an amount of from 0 to 1.5% by weight, preferably from 0.1 to 1% by weight.

Certain salts that are known to have an efficacious effect in animals may also be present in the mixture. The salt may be added as a separate component prior to the high shear rate mixing. Alternatively, the salt may be present as an admixture with the methionine powder and may be granulated with the methionine powder. In such case, the methionine powder may be used directly from the production method which can comprise a mixture of methionine and a salt, the salt having been co-formed during the saponification step. In particular, metal salts of Group I or II of the Periodic Table, for example, sodium or potassium, especially sodium, may be present with the methionine powder. Suitable salts are halides such as sodium chloride, sulphates such as sodium sulphate and the methioninate salt such as sodium methioninate. Suitably, the salt may be present in the mixture in an amount of from 0 to 30%, preferably from 10 to 20% by weight.

Further nutritionally active compounds may also be present, for example amino acids such as lysine and vitamins such as Vitamin A and Vitamin E. Such compounds may be present in the mixture in an amount of from 0 to 20 weight %.

The second step of the process of the present invention involves high shear rate mixing of the mixture to form the granules. The mixing is carried out using any suitable apparatus that is capable of providing the necessary mixing, for example, high shear and high speed mixers, especially an impeller mixer in which the mixture is centrifuged against the walls of the mixer chamber. The speed of the mixer will depend upon the size and capacity of the mixer. The mixing is suitably carried out at a speed of at least 5 ms$^{-1}$, preferably between 30 and 80 ms$^{-1}$. This granulation step may be carried out at ambient or elevated temperature, preferably at ambient temperature.

The resulting granules are then dried, preferably using a fluidised bed drier at a temperature of up to 150° C., preferably between 20 and 150° C.

The aforementioned processes may be carried out as a continuous process or as a batch process.

The granule produced from this granulation process has a substantially spherical shape and, thus, does not require further treatment. A particular advantage of the granule produced by the method of the present invention is that the granule has a bulk density similar to the resulting pellet of animal feed to which the methionine granule is to be incorporated. The resulting methionine granule also exhibits good mixability in the animal feed. In particular, it has been found that the method of the present invention provides granules of methionine having a bulk density of at least 0.6 g/cm$^3$, preferably at least 0.7 g/cm$^3$, this being in the same region as the density of the animal feed pellets. Thus, according to another aspect of the present invention there is provided granules of methionine prepared as hereinbefore defined having a bulk density of at least 0.6 g/cm³.

The granules of methionine suitably have a particle size distribution of from 50 to 2000 microns, preferably from 100 to 1500 microns, especially from 200 to 1200 microns, with less than 10% of the granules being less than 200 microns and less than 10% greater than 1000 microns.

The granules of methionine produced by the process of the present invention suitably contain from 65 to 98% methionine, 0.3 to 12% binding agent, less than 1% water and from 0 to 1.7% by weight surfactant. When a salt is present in the mixture, the ratio of methionine to salt suitably is from 0.7 to 1.

In particular, we have found that granules of methionine comprising sodium chloride, have a bulk density of at least 0.7 g/cm³ and the particle size distribution is of from 100 microns to 2000 microns, preferably from 400 to 1500 microns.

The granules of methionine may be used as an animal feed supplement and thus according to a further aspect of the present invention there is provided an animal feed composition comprising granules of methionine as hereinbefore defined.

The invention will now be illustrated with reference to the following examples:

Examples 1 to 7 exemplify the preparation of the granules of methionine according to the present invention. Comparative Examples A to D exemplify the preparation of granules according to the prior art method.

In Examples 1 to 7, the following equipment was used:
A Fryma Diosna mixer of 30 liters capacity
A Retsch TG-1 fluidised bed dryer.

In comparative Examples A to D the following equipment was used:
A Lodige blender of 5 liters capacity
A Fuji Paudal DG-L1 extruder (flow 5 to 50 kg/hour)
A Retsch TG-1 fluidised bed dryer To evaluate the properties of the granules the following standard tests were carried out:
(1) Water Content—The amount of water was determined by infra red balance at 105° C. until constant weight.
(2) Granule Size—The size of the granule was measured by passing 100 g of granules through Retsch sieves with 1.5 mm of amplitude for 10 minutes.
(3) Bulk and Tapped Density—The bulk and tapped density were measured by powder volumenometer (230 ml).
(4) Carr Index—Defined as:

(Bulk Density—Tapped Density)/Bulk Density.

(5) The Jenike Index was measured by a flow tester which is the ring shear stress of Schulze (device referenced RST-01.01 Dr Ing. Dietmar Schulze, Wolfenbuttel, Germany). Jenike Index is defined by the ratio of principal stress at a steady flow to the unconfined yield strength.

Granules of methionine, as detailed in Examples 1 to 7, were prepared according to the following procedure:

Step (1): The powdered methionine, binder and water were added to the mixer operating at a stirring speed of 6 ms⁻¹. The stirring was continued for 10 minutes.

Step (2): Where a surfactant was used, the surfactant powder was dissolved with stirring in water at ambient temperature until a homogeneous solution was obtained. The surfactant solution was sprayed into the blender using a nozzle operating at a liquid flow between 3.6 and 10 kg/h.

The spraying was continued for 10 minutes. The crushing turbine was then operated for 30 minutes.

Step (3): The resulting granules were dried at 40° C. for 60 minutes.

EXAMPLE 1

Powdered methionine, starch binding agent, water and a surfactant were used in the following amounts:

TABLE 1

| Component | Concentration of Component (%) | Concentration in dry granule (%) | Weight (g) |
| --- | --- | --- | --- |
| powdered methionine | 81.28 | 97.85 | 2450.0 |
| pregeletanised starch | 0.80 | 0.97 | 24.2 |
| surfactant | 0.15 | 0.18 | 4.6 |
| water | 17.76 | 1.00 | 535.3 |
| total | 100.00 | 100.00 | 3014.1 |

The concentration of surfactant in water 0.8%.
The ratio of methonine to binder was 1%.
The resulting granules have a mean diameter D50 equal to 608 microns with 10%<200 microns and 10%>1 mm. The bulk density was 0.650 g/cm³, the tapped density was 0.720 g/cm³, the Carr Index was 11% and the Jenike Index was 23.

EXAMPLE 2

The procedure of Example 1 was repeated but the binding agent was introduced as a mix with the surfactant in an aqueous solution at 4.6 kg/h.

TABLE 2

| Component | Concentration of Component (%) | Concentration in dry granule (%) | Weight (g) |
| --- | --- | --- | --- |
| powdered methionine | 81.28 | 97.85 | 2000.0 |
| pregelatinised starch | 0.80 | 0.97 | 19.7 |
| surfactant | 0.15 | 0.18 | 3.7 |
| water | 17.76 | 1.00 | 437.0 |
| total | 100.00 | 100.00 | 2460.4 |

The concentration of surfactant in water was 0.85%.
The ratio of methionine to binder was 1%.
The granules had D50 equal to 610 microns with 13% less than 200 microns and 5% greater than 1000 microns. The bulk density was 0.643 g/cm³, the tapped density was 0.704 g/cm³, the Carr Index was 9.5%.

EXAMPLE 3

The procedure of Example 1 was repeated but varying the amount of starch and with the following amounts of components:

TABLE 3

| Component | Concentration of Component (%) | Concentration in dry granule (%) | Weight (g) |
| --- | --- | --- | --- |
| powdered methionine | 80.18 | 96.82 | 2000.0 |
| pregeletanised starch | 1.60 | 1.96 | 40.0 |

TABLE 3-continued

| Component | Concentration of Component (%) | Concentration in dry granule (%) | Weight (g) |
|---|---|---|---|
| surfactant | 0.18 | 0.22 | 4.5 |
| water | 18.04 | 1.00 | 450.0 |
| Total | 100.00 | 100.00 | 2494.5 |

The concentration of surfactant in water was 1%.

The ratio of methionine to binder was 2%.

The resulting granules had D50 equal to 930 microns with 1%<200 microns and 40%>1 mm. The bulk density was 0.68 g/cm$^3$, the tapped density was 0.74 g/cm$^3$ and the Carr Index was 8%.

EXAMPLE 4

The procedure of Example 1 was repeated varying the amount of starch and with the following amounts of components:

TABLE 4

| Component | Concentration of Component (%) | Concentration in dry granule (%) | Weight (g) |
|---|---|---|---|
| powdered methionine | 78.00 | 94.12 | 2980.0 |
| pregeletanised starch | 3.90 | 4.76 | 149.0 |
| surfactant | 0.10 | 0.12 | 3.7 |
| water | 18.00 | 1.00 | 688.0 |
| total | 100.00 | 100.00 | 3820.7 |

The concentration of surfactant in water was 0.5%.

The ratio of methionine to binder was 5%.

The resulting granules had D50 equal to 1 mm with 1%<200 microns. The bulk density was 0.626 g/cm$^3$, the tapped density was 0.678 g/cm$^3$ and the Carr Index was 8%.

EXAMPLE 5

The procedure of Example 1 was repeated but replacing the starch with xanthane gum and with the following amounts of components:

TABLE 5

| Component | Concentration of Component (%) | Concentration in dry granule (%) | Weight (g) |
|---|---|---|---|
| powdered methionine | 79.02 | 97.76 | 1700.0 |
| xanthane gum | 0.79 | 0.99 | 17.0 |
| surfactant | 0.20 | 0.25 | 4.3 |
| water | 19.99 | 1.00 | 430.0 |
| total | 100.00 | 100.00 | 2151.3 |

The concentration of surfactant in water was 1%.

The ratio of methionine to binder was 1%.

The resulting granules had a medium diameter D50 equal to 1 mm with 5% of the granules less than 200 microns. The bulk density was 0.610 g/cm$^3$ and the tapped density was 0.670 g/cm$^3$ and the Carr Index was 10%.

EXAMPLE 6

The procedure of Example 1 was repeated varying the amount of starch and including a salt and with the following amounts of components:

TABLE 6

| Component | Concentration of Component (%) | Concentration in dry granule (%) | Weight (g) |
|---|---|---|---|
| powdered methionine | 71.30 | 82.16 | 1700.0 |
| sodium chloride | 12.58 | 14.68 | 300.0 |
| pregelatinised starch | 1.68 | 1.96 | 40.0 |
| surfactant | 0.18 | 0.20 | 4.2 |
| water | 14.26 | 1.00 | 340.0 |
| total | 100.00 | 100.00 | 2384.2 |

In this example, the sodium chloride salt was added to the blender with the powdered methionine and the binder.

The concentration of surfactant in water was 1.2%.

The ratio of methionine to binder was 2.35%.

The resulting granules had D50 equal to 430 microns with 17%<200 microns and 5%>1 mm. The bulk density was 0.716 g/cm$^3$, the tapped density was 0.770 g/cm$^3$ and the Carr Index was 8%. The Jenike Index was 16.5.

EXAMPLE 7

The procedure of Example 6 was repeated varying the amount of salt and with the following amounts of components:

TABLE 7

| Component | Concentration of Component (%) | Concentration in dry granule (%) | Weight (g) |
|---|---|---|---|
| powdered methionine | 63.19 | 71.33 | 1700.0 |
| sodium chloride | 22.30 | 25.53 | 600.0 |
| pregelatinised starch | 1.72 | 1.96 | 46.2 |
| surfactant | 0.16 | 0.18 | 4.2 |
| water | 12.63 | 1.00 | 340.0 |
| total | 100.00 | 100.00 | 2690.4 |

The concentration of surfactant in water was 1.2%.

The ratio of methionine to binder was 2.7%.

The resulting granules had D50 equal to 570 microns with 5%>1 mm and 11%<200 microns. The bulk density was 0.774 g/cm$^3$, the tapped density was 0.817 g/cm$^3$ and the Carr Index was 8%. The Jenike Index was 24.5.

COMPARATIVE EXAMPLES

Granules of methionine were prepared by the extrusion method according to the following steps:

Step (1): The binder was dissolved, with stirring, in water at ambient temperature until a homogeneous solution (2% w/w) was obtained.

Step (2): The temperature of the blender was set at 60° C. The powdered methionine was placed in the blender operating at a stirring speed of 2 minutes per second. The binder solution prepared in Step (1) was then added at a rate of 500 grams per minute and the resulting mixture was stirred until a paste was formed. The paste was then left to cool to ambient temperature.

Step (3): The paste was placed in the extruder which was fitted with a 0.7 mm size grid. The extrudate material was transferred to the fluidised bed dryer where the granules were left to dry at ambient temperature for 60 minutes, followed by a further 60 minutes at 60° C.

COMPARATIVE EXAMPLE A

Comparative to Example 1

Powdered methionine, starch binding agent and water were used in the following amounts:

TABLE A

| Component | Concentration of Component (%) | Concentration in dry granule (%) | Weight (g) |
|---|---|---|---|
| powdered methionine | 73.98 | 98.00 | 600.0 |
| pregeletanised starch | 0.75 | 1.00 | 6.1 |
| water | 25.27 | 1.00 | 204.9 |
| total | 100.00 | 100.00 | 811.0 |

The concentration of starch in solution was 3% w/w.

75% of the granules had a size distribution of between 200 and 1000 microns with 5% greater than 1000 microns and 20% less that 200 microns. The bulk density and tapped density were determined to be 0.470 g/cm$^3$ and 0.620 g/cm$^3$ respectively. The Carr Index was 15%.

COMPARATIVE EXAMPLE B

Comparative to Example 4

The procedure of Comparative Example A was repeated using a cellulose binder and with the following amounts of components.

TABLE B

| Component | Concentration of Component (%) | Concentration in dry granule (%) | Weight (g) |
|---|---|---|---|
| powdered methionine | 69.93 | 95.92 | 400.0 |
| pregelatinised starch | 2.97 | 4.08 | 17.0 |
| water | 27.10 | 1.00 | 155.0 |
| total | 100.0 | 100.00 | 572.0 |

The extruder was fitted with a 1 mm grid and the concentration of cellulose in solution was 11% w/w.

80% of the granules had a size distribution of between 500 and 1600 microns with 20% less than 500 microns. The bulk density and tapped density were determined to be 0.420 g/cm$^3$ and 0.530 g/cm$^3$ respectively. The Carr Index was determined to be 26%.

COMPARATIVE EXAMPLE C

Comparative to Example 5

The procedure of Comparative Example A was repeated using a xanthane gum as binder and with the following amounts of components.

TABLE C

| Component | Concentration of Component (%) | Concentration in dry granule (%) | Weight (g) |
|---|---|---|---|
| powdered methionine | 70.55 | 98.58 | 400.0 |
| xanthane gum | 0.30 | 0.42 | 1.7 |
| water | 29.15 | 1.00 | 165.3 |
| Total | 100.00 | 100.00 | 567.0 |

The concentration of xanthane gum in solution was 1% w/w.

97% of the granules had a size distribution of between 200 and 1600 microns with 3% greater that 1600 microns and 3% less than 200 microns. The bulk density and tapped density were determined to be 0.540 g/cm$^3$ and 0.610 g/cm$^3$ respectively. The Carr Index was determined to be 13%.

COMPARATIVE EXAMPLE D

Comparative to Example 7

The procedure of Example A was repeated but with the addition of sodium chloride salt and with the following amounts of components.

TABLE D

| Component | Concentration of Component (%) | Concentration in dry granule (%) | Weight (g) |
|---|---|---|---|
| powdered methionine | 52.00 | 68.33 | 416.0 |
| pregelatinised starch | 0.50 | 0.67 | 4.0 |
| sodium chloride | 22.50 | 30.0 | 180.0 |
| water | 25.00 | 1.00 | 200.0 |
| total | 100.00 | 100.00 | 800.0 |

The concentration of starch in solution was 2% w/w.

60% of the granules had a size distribution of between 200 and 1000 microns with 26% greater that 1000 microns and 14% less than 200 microns. The bulk density and tapped density were determined to be 0.570 g/cm$^3$ and 0.640 g/cm$^3$ respectively. The Carr Index was determined to be 12%.

It can be seen from these examples that the process of the present invention provides granules with greater bulk density than the extrusion method.

The invention claimed is:

1. A process for the preparation of granules of methionine which process comprises (a) forming a mixture of methionine powder, a binding agent and water; (b) applying the mixture to a high shear rate mixing, thereby forming substantially spherical granules of said mixture; and (c) drying said granules, wherein there is no additional shaping step after the high shear rate mixing.

2. A process as claimed in claim 1 where the granulation is carried out in a high shear and high speed mixer wherein the mixture is centrifuged against the walls of the mixer.

3. A process as claimed in claim 1 in which the methionine powder is characterised by a bulk density of from 300 to 500 kg/m$^3$ and a tapped density of from 500 to 600 kg/m$^3$ and a particle size distribution wherein at least 40% of the particles of methionine have size greater than 150 microns.

4. A process as claimed in claim 1 in which the binding agent is selected from the group consisting of cellulose, starch, hydrocolloid gum, polyvinyl alcohol, polyvinyl pyrrolidone, sugar and syrup of sugar.

5. A process as claimed in claim 1 wherein the mixture comprises 30 to 82% by weight methionine powder, 0.3 to 10% by weight binding agent and 15 to 65% by weight water.

6. A process as claimed in claim 1 in which the mixture further comprises a surfactant selected from the group consisting of non ionic surfactants and anionic surfactants.

7. A process as claimed in claim 1 in which the mixture further comprises a salt selected from Group I or II of the Periodic Table.

8. A process as claimed in claim 7 in which the salt is sodium chloride or sodium methioninate.

9. A process as claimed in claim 1 carried out continuously or batch.

* * * * *